F. K. VREELAND.
ELECTRICAL OSCILLATOR.
APPLICATION FILED DEC. 18, 1906.
1,152,675.
Patented Sept. 7, 1915.
3 SHEETS—SHEET 1.
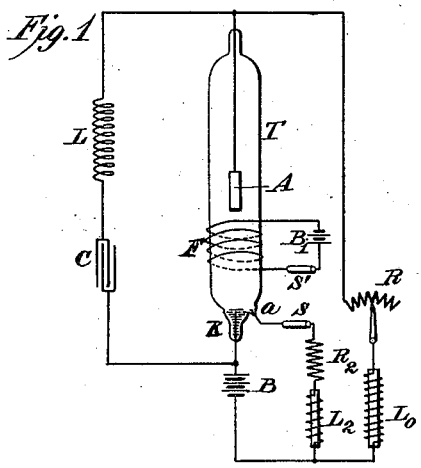
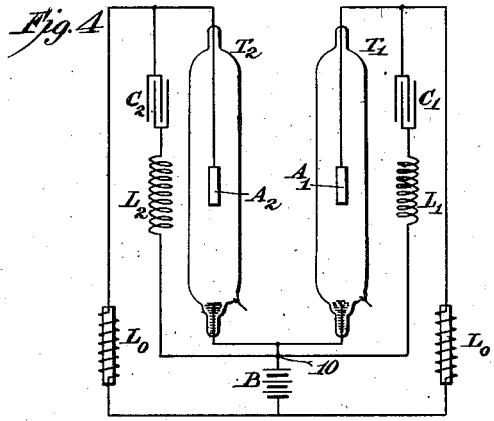
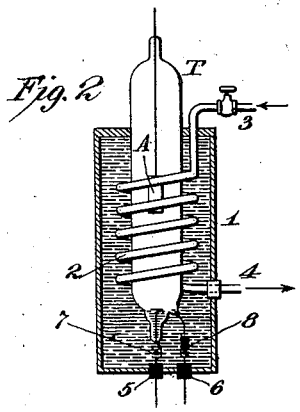
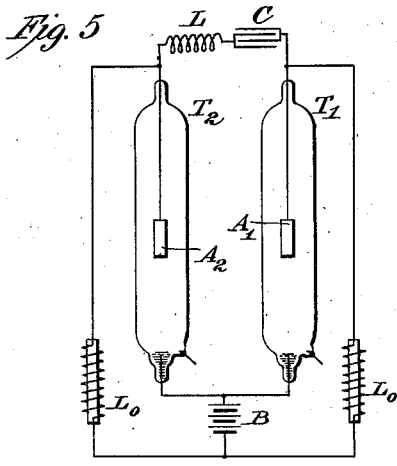
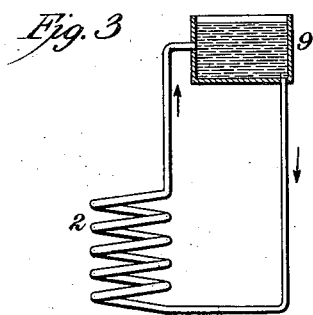
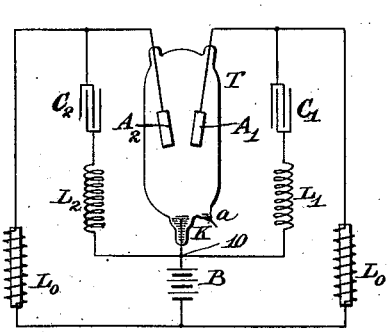
Witnesses:
Inventor
Frederick K. Vreeland
By Dyer & Dyer
Attorneys.

F. K. VREELAND.
ELECTRICAL OSCILLATOR.
APPLICATION FILED DEC. 18, 1906.
1,152,675.
Patented Sept. 7, 1915.
3 SHEETS—SHEET 2.
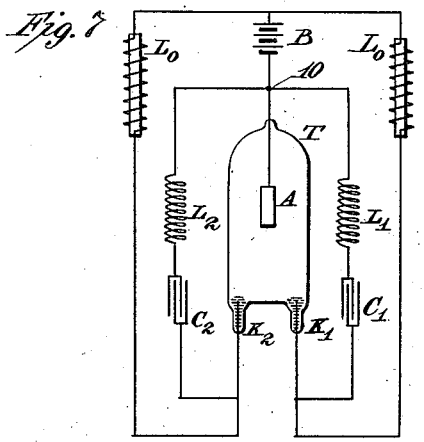
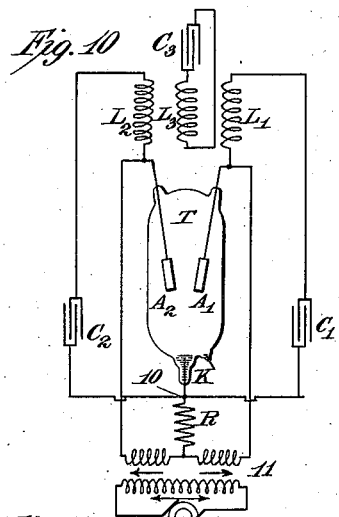
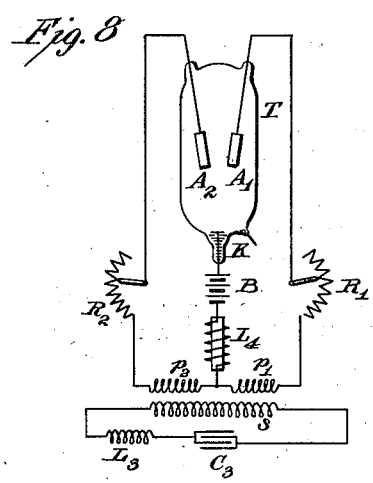
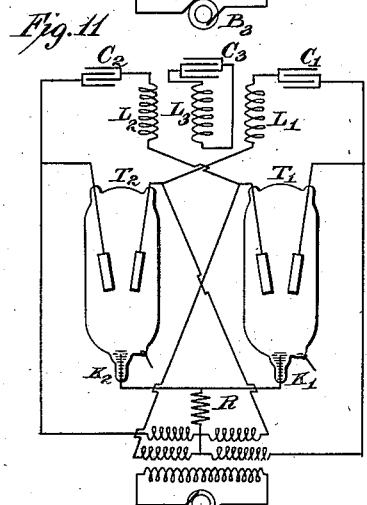
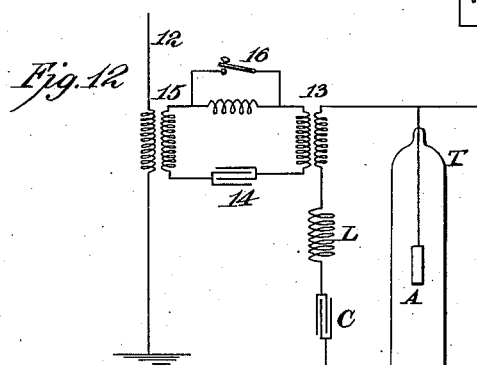
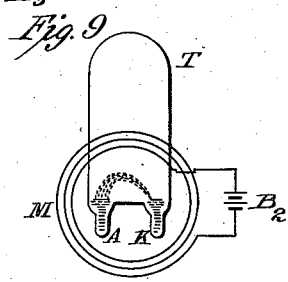
Witnesses:
Inventor
Frederick K. Vreeland
By Dyer & Dyer
Attorneys.

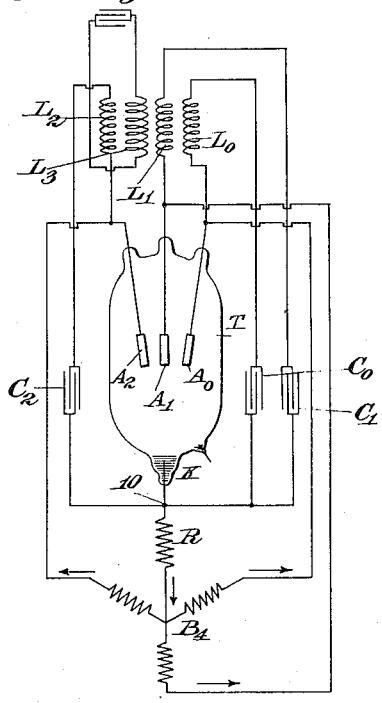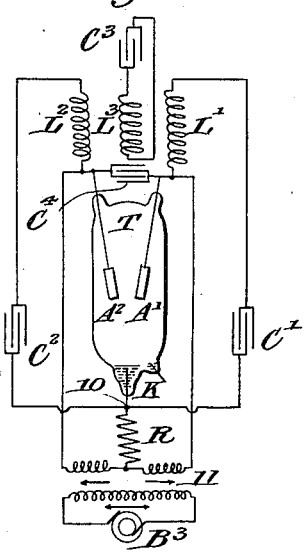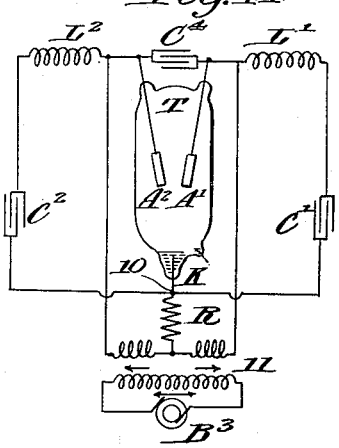

UNITED STATES PATENT OFFICE.

FREDERICK K. VREELAND, OF MONTCLAIR, NEW JERSEY, ASSIGNOR TO WIRELESS TELEGRAPH EXPLOITATION COMPANY, OF NEW YORK, N. Y., A CORPORATION OF NEW YORK.

ELECTRICAL OSCILLATOR.

1,152,675.     Specification of Letters Patent.     Patented Sept. 7, 1915.

Application filed December 18, 1906. Serial No 348,403.

*To all whom it may concern:*

Be it known that I, FREDERICK K. VREELAND, a citizen of the United States, residing at Montclair, in the county of Essex and State of New Jersey, have invented a certain new and useful Improvement in Electrical Oscillators, of which the following is a description.

The object of the invention is to produce a system for generating electrical oscillations capable of translating the energy of a unidirectional or low frequency alternating source into undamped or sustained oscillations of a high or different frequency.

In the accompanying drawing, Figure 1 illustrates in diagram one arrangement embodying the invention; Figs. 2 and 3 are illustrations of means for cooling the apparatus; Figs. 4, 5, 6, 7, 8, 9, 10 and 11 are diagrams illustrating different constructions of apparatus or different arrangements of circuit connections; Fig. 12 is a diagram illustrating the connections of the oscillator with an antenna for using the oscillator as an element in a wireless telegraph or telephone transmitter; and Figs. 13, 14 and 15 illustrate further modifications.

The present invention relates to the production of undamped or sustained electrical oscillations through the agency of an electrical discharge in a rarefied gaseous medium. In experimenting with high vacuum mercury vapor tubes for the purpose of producing commutation of energy by means of a magnetic field, as described in my Patents Nos. 829447 and 829934, I have observed that the discharge in such tubes possesses to some extent the property of so-called " negative resistance ", *i. e.* a momentary increase in current is accompanied by a decrease in the potential difference between the terminals, and vice versa.

In using the term "negative resistance" herein, I do not refer to changes in the steady state of the discharge which accompany slow variations in the current, but to the practically instantaneous changes which occur during a single cycle of the oscillation and which are represented mathematically by the differential expression $$\frac{dE}{dI} < 0$$

where E is the electromotive force across the terminals of the tube and I is the current. Furthermore, I do not intend to define the physical nature of the phenomena involved, nor to assert that the effect is due to changes in resistance, strictly speaking, as distinguished from other causes of varying conductivity. When a tube having this property to a sufficient extent is properly associated with a source of power and an oscillating circuit any accidental diminution in the conductivity of the tube tends to force a momentary current through the oscillating circuit, and the very act of shunting some of the current from the tube decreases the conductivity of the gaseous medium and tends to cause a still greater current to flow through the oscillating circuit. This continues until a point is reached where the charging of the condenser prevents a further flow of current in the initial direction, and the condenser is discharged with a current in the opposite direction, which has the effect of increasing the conductivity of the tube and of promoting a still further increase of current in that direction. Thus oscillations are excited with a frequency determined by the electrical constants of the oscillating circuit. With a high vacuum mercury vapor tube the property of negative resistance is most marked when the current density in the discharge is low and when the mercury vapor in the tube is comparatively cool. If too large a current be forced through such a tube or the tube is allowed to become hot it loses this desirable property to a greater or less extent. Hence such a tube is subject to limitations in the amount of power that can be effectively handled.

I have discovered that if, in addition to the mercury vapor contained in the tube, a small amount of a gas, non-condensable under the conditions of operation, such as hydrogen is admitted, the tube becomes capable of handling very large currents at high temperatures without losing, but rather increasing, its effectiveness in producing high frequency oscillations. At the same time the voltage required to maintain the discharge is greatly increased, and the variations of this voltage which are effective in exciting oscillations are augmented in a marked degree. This fact makes it possible to greatly diminish the length of the discharge, and the discharge itself, instead of filling the whole tube with a diffused glow, becomes concentrated in an intensely brilliant stream of small diameter. The intensity and temperature of this discharge and the voltage required to maintain it depend upon the pressure of gas in the tube. In general the discharge becomes hotter and brighter and the voltage required to maintain it increases as the gas pressure is increased. The apparatus will work effectively over a wide range of gas pressure. In general the amount of gas in the tube should be adjusted according to the dimensions of the tube and the terminal voltage at which it is desired to work. As an example, I have found that a tube having a distance of from two to five inches between anode and cathode and having hydrogen gas admitted until the pressure in the tube, when cold, is equal to from one-half to two millimeters of mercury, operates very satisfactorily with a voltage across the terminals of from 75 to 500 volts; although these figures are by no means limiting ones and may be varied considerably in either direction. A variety of gases may be used in the tube and a variety of materials may be employed for the anode or cathode. Mercury is a desirable material for the cathode, owing to its low cathode voltage and to its self-renewing property. The vapor which it gives off is also desirable, in addition to the other gas in the tube. Anodes of carbon are very effective, and the gas is preferably an inert one, such as hydrogen or nitrogen or carbonic acid. Where hydrogen gas is used with a carbon anode it combines to some extent with the carbon, forming acetylene or other hydro-carbon gases. It is also possible to use atmospheric air, whose oxygen combines with the carbon and after a short time becomes inert. When the gas is first admitted to a highly exhausted tube a considerable quantity of it is gradually absorbed, especially by the carbon anode; hence it is necessary to gradually let in more and more gas. After a time, however, a stable condition is reached, after which the properties of the tube remain practically constant.

With a low vacuum tube, as above described, there is usually a minimum value of the current below which it does not operate satisfactorily. Below this critical current the discharge is comparatively pale and diffused, but as the current is gradually increased, as by cutting out series resistance, a point is reached where a sudden decrease in terminal voltage occurs, the discharge simultaneously brightens and becomes more intense and concentrated and it becomes very effective in exciting oscillations. Further increasing the current in the tube does not impair the effectiveness of the discharge, at least within the limits ordinarily imposed by the necessity of disposing of the heat generated. For each tube, however, there is usually a certain current at which the tube works most effectively. This current depends, among other things, upon the increased gas and vapor pressure due to the heating of the tube, which in turn depends upon the amount of energy expended in the tube, the dimensions and radiating surface of the tube, and the effectiveness of the means employed for carrying off the heat. A tube having a diameter of 2 inches and a length of 6 inches, with proper means for carrying off the heat, will easily carry a current of from 10 to 15 amperes in a stream 3 inches long whose apparent diameter is less than a quarter of an inch. Larger tubes will carry proportionately larger amounts of energy.

Compared with the conditions found in the "singing-arc" method of producing electrical oscillations employed by Duddell, Poulsen and others, my apparatus employs a relatively long arc at a moderate voltage, i. e., one in which the potential gradient is relatively small. The potential gradient is, however, considerably higher than in the high vacuum apparatus described in my patents before referred to, which lacks the high negative resistance and the concentrated discharge or arc found in the present apparatus.

In Fig. 1, T is a glass tube containing an anode A of carbon and a cathode K of mercury. This tube is operated by a battery or source of direct current B whose positive terminal is connected to the anode A through an inductance or choke coil $L_0$ whose function is to steady the current supplied by the source B, and the negative terminal of the source is connected to the cathode K. It is desirable also to have an adjustable resistance R for controlling the current through the tube and for counteracting the instability due to the "negative resistance;" or the coil $L_0$ may be given sufficient resistance to accomplish this result. A, L, C, K is oscillating circuit shunted across the terminals A, K of the tube and containing a self-induction L and a capacity C. This circuit is the seat of the oscillations or alternating currents, whose frequency is determined by the capacity and inductance of C and L and by the resistance, which resistance should be as low as possible. An auxiliary anode $a$ of mercury is employed for starting the tube; it is placed close to the cathode K so that the discharge may be established between them by causing the mercury to flow from one to the other by tilting the tube. When this mercury bridge is broken and the auxiliary discharge started, the main discharge starts readily, as the principal resistance, which is located at the surface of the cathode, is broken down. S is a switch whereby the auxiliary anode $a$ may be disconnected from the source of power after the main discharge is started, and $L_2$ and $R_2$ are a choke coil and a resistance, respectively, for steadying the auxiliary discharge and preventing too great a rush of current.

The operation of this apparatus is as follows: When the apparatus is started and a current flows through the tube the tendency of the coil $L_0$ and resistance R is to maintain the current steady and constant. There are always, however, some slight variations in the conductivity of the tube. Suppose for example, that a sudden decrease in conductivity tends to diminish the current through the tube and increase the electromotive force across it. The effect of this will be to cause a momentary flow of current through the oscillating circuit from A to K. The tube being thus robbed of part of its current, suffers a still further decrease in conductivity, and this further increases the current through the oscillating circuit from A to K. This continues until the condenser C is charged to the point where it causes a reversal of the current, with a corresponding increase in the conductivity of the tube, and an increased tendency for the reversed current in the oscillating circuit to flow through the tube. These successive reversals occur with a frequency determined by the electrical constants of the oscillating circuit.

The effect of lowering the vacuum in causing the discharge to become concentrated and effective for exciting oscillations by means of its property of negative resistance may be augmented, especially when the vacuum is rather high, by a magnetic field whose flux is preferably parallel to the direction of the discharge. Such a field may be excited by a coil F, carrying a current supplied by a battery or other source $B_1$. Even at quite high vacua such a field has the effect of concentrating the discharge into an intense stream which is quite effective in exciting oscillations. This field is however not necessary to the operation of the device if the gas pressure in the tube is increased to the requisite extent.

Fig. 2 illustrates one mode of disposing of the heat generated in the tube. 1 is a vessel containing oil or other suitable liquid in which the tube T is immersed. 2 is a worm or coil of pipe surrounding the tube and fed with a current of water entering through a stop-cock 3 and leaving through the opening 4. The lower terminals of the tube are brought out through insulating bushings 5 and 6 in the bottom of the containing vessel. The connecting wires 7 and 8 are made flexible to permit tilting of the tube for starting the arc.

Fig. 3 represents another arrangement in which the ends of the worm 2 are connected with a vessel 9 containing water. The heat generated in the worm causes a spontaneous circulation of the water, as indicated by the arrows. The water in the vessel 9 may be allowed to boil, thus disposing of a large amount of heat. Instead of using an oil bath the tube may be immersed in a vessel of water or other suitable liquid which is kept cool by constant circulation or by permitting it to boil. In case water is used it is of course necessary to insulate the connections 7 and 8 to prevent short-circuiting through the liquid.

Fig. 4 represents a double apparatus comprising two tubes $T_1$ and $T_2$, each containing a single anode and a single cathode and each shunted by a separate oscillating circuit $C_1 L_1$ and $C_2 L_2$ respectively. These two tubes with their oscillating circuits may be used independently, or if the oscillating circuits are made symmetrical or at least tuned to the same frequency, they will oscillate together as one circuit $A_1 C_1 L_1$ 10 $L_2 C_2 A_2$, whose natural frequency will be the same as that of either circuit alone. If necessary to secure synchronism of the two oscillations the inductances $L_1$ and $L_2$ may be inductively coupled.

When the two oscillating circuits are operated in synchronism the connection 10 between these circuits and the cathodes of the tubes may be opened, in which case the oscillating circuit may be simplified by the use of a single capacity and inductance C L as shown in Fig. 5. In this case the effect of the current and voltage changes in the tubes in exciting the oscillations is a differential one; when the current in $T_1$ is less than the normal and decreasing the current in $T_2$ will be greater than the normal and increasing, and a correspondingly increasing current will flow through the oscillating circuit from $T_1$ to $T_2$. At the same time the voltage across $T_1$ will be greater than that across $T_2$ and will thus furnish the necessary impetus for forcing the current through the oscillating circuit.

An important feature of the arrangement shown in Fig. 4 as well as of those shown in Figs. 5, 6, 7, 8 and 11, as distinguished from the arrangement shown in Fig. 1, is the use of two separate and preferably symmetrical circuits supplying current through separate paths in the sensitive medium and the connecting of the oscillating circuit between homologous points of the circuits including such paths. The two current streams or arcs are thus connected in parallel as regards the power circuit and in series as regards the oscillating circuit. They thus act on the oscillating circuit differentially, but inasmuch as any change in the condition of one path is accompanied by an opposite change in the other this differential effect becomes cumulative as regards the oscillating circuit by virtue of the connection of this circuit between homologous points of the two paths.

Fig. 6 represents an apparatus whose connections are similar to those of Fig. 4, but which has a single tube T, with two anodes $A_1$ $A_2$ in place of the two tubes $T_1$ $T_2$ each with one anode. The operation of this form is similar to that of Fig. 4 in its general aspects though it possesses certain advantages; for example, the use of a single cathode eliminates to a large extent the fluctuations which are sometimes caused by variations in cathode state.

By opening the connection 10 between the two oscillating circuits and the cathode K a form of apparatus will be obtained which is similar to that illustrated in Fig. 5, in which two tubes are used.

Fig. 7 represents a form of apparatus similar to that illustrated in Fig. 6, but having two mercury cathodes $K_1$ and $K_2$ and one anode A instead of two anodes and one cathode. The operation of this apparatus is similar to that of Fig. 6. This apparatus may also be used without the connection 10 in the manner referred to in describing Fig. 6.

It is not necessary that the choke coil $L_0$ in the preceding figures shall keep the current in the power circuits constant; indeed if the coils $L_0$ are made without iron so that they will not unduly waste energy they may have relatively small inductance, permitting the oscillations to shunt through these coils, which will thus constitute part of the oscillating system.

Fig. 8 represents an extreme case in which the shunt oscillating circuits C L, $C_1$ $L_1$, $C_2$ $L_2$ of the other figures are omitted and the oscillations are caused to flow in their entirety through the portions of the power circuits $A_1$ $p_1$ $p_2$ $A_2$ which thus constitutes the primary oscillating circuit. To avoid placing a condenser in this circuit and thus interrupting the power current which supplies the tube, the condenser $C_3$ is located in a secondary oscillating circuit which is inductively coupled with the primary $p_1$ $p_2$ and thus constitutes a part of the oscillating system. The transformer $p_1$ $p_2$ s is preferably a closely coupled one, in which case it is desirable to insert an additional self-induction $L_3$ in the secondary oscillating circuit. $R_1$ $R_2$ are adjustable resistances which are sometimes necessary to insure the proper division of the current between the anodes $A_1$ and $A_2$. These resistances should preferably be cut out, or at least reduced to a minimum, when the oscillations are established. $L_4$ as before is a choke coil for steadying the current in the tube.

Fig. 9 illustrates a tube having two electrodes, both of mercury, one of which, A, is used as anode, and the other, K, as cathode. Such a tube may be substituted for the tube shown in Fig. 1. Where the vacuum is low and the discharge correspondingly hot, there is danger, in this form of tube, of the glass breaking, owing to its proximity to the discharge which draws across from anode to cathode. To avoid this difficulty the field coil M, fed by a source of current $B_2$, may be employed, the direction of the current in the coil being such as to deflect the discharge upwardly away from the glass as indicated in the figure.

The source of power for energizing the circuits may be an alternating one, as illustrated in Fig. 10, in which $B_3$ is a source of alternating current supplying a transformer 11; a connection is made from the center of the secondary of the transformer to the cathode K, while the ends of the transformer secondary are connected with the anodes $A_1$ $A_2$. Primary oscillating circuits $C_1$ $L_1$ and $C_2$ $L_2$ connect the cathode with the anodes, and the coils $L_1$ $L_2$ of these circuits are placed in inductive relation with the coil $L_3$ of a secondary oscillating circuit $L_3$ $C_3$.

The oscillating circuits $A_1$ $L_1$ $C_1$ K and $A_2$ $L_2$ $C_2$ K should be symmetrical or at least tuned to the same frequency, and the oscillating circuit $C_3$ $L_3$ should be tuned to resonance with the other two circuits, due allowance being made for the effect of mutual induction in determining the natural frequencies of the circuits. R is a resistance, preferably inductive, for steadying the current and helping to prevent the discharge from breaking.

The apparatus shown in Fig. 10 operates as a combined rectifier and oscillator. The property of a mercury vapor tube of allowing a discharge to flow only in one direction is utilized in the wellknown way for rectifying the current from the alternating source $B_3$. The half waves thus separated pass alternately from the anodes $A_1$ and $A_2$ to the cathode K. As the current in either of the anodes is an intermittent one the oscillations induced in the oscillating circuit connected thereto will in general be intermittent. The coils $L_1$ $L_2$ however act similarly and cumulatively on the secondary oscillating circuit $L_3$ $C_3$ and the oscillations induced therein will be continuous though variable. A condenser $C_4$ (Fig. 10), whose capacity is preferably large compared to that of the condensers $C_1$ and $C_2$, although small when considered in relation to the frequency of the alternating current supply, may be shunted across the anodes $A_1$ $A_2$, thus uniting the oscillating circuits $C_1$ $L_1$ and $L_2$ $C_2$ and preventing the entire interruption of the currents in either of them (Fig. 13). The coils should be wound in opposite directions when connected as shown, so that they will act similarly on the secondary oscillating circuit. When the condenser $C_4$ is used the secondary oscillating circuit $C_3$ $L_3$ may be omitted and the circuit $C_1$ $L_1$ $C_4$ $L_2$ $C_2$ 10 will oscillate as one oscillating system (Fig. 14).

The intermittent or variable character of the oscillations produced by such an apparatus with alternating current supply constitutes a distinct advantage under some conditions. For example, when the oscillator is used in a transmitter of wireless telegraph signals, the signal observed at the receiving station will be a pulsating one which, if a telephonic receiver is used, will produce an audible note whose pitch is determined by the frequency of the alternating supply $B_3$. Such a signal is much more easily detected by the ear than a continuous one which affects the telephone only at the moments of its beginning and cessation.

It is obvious that the apparatus may be adapted to a three-phase supply by providing it with three anodes instead of two, each with its associated oscillating circuit as shown in Fig. 15.

Fig. 11 represents a form of apparatus with alternating current supply which bears a relation to that of Fig. 10 similar to the relation between the apparatus of Figs. 1 and 5. Here two tubes $T_1$ and $T_2$ are employed, each with two anodes and each operating as a rectifier of the alternating current supply. The primary oscillating circuits instead of being connected from anode to cathode of these tubes are connected across the two similar anodes respectively of the two tubes.

In utilizing the oscillations produced by an apparatus of any of the forms herein described a great variety of wellknown arrangements may be used, some of which are described in my patents above referred to. One such arrangement is shown in Fig. 12, in which the apparatus illustrated in Fig. 1 is coupled to an antenna, 12, for use as a wireless telegraph or telephone transmitter. The coupling may be effected in a variety of ways; in the illustration it is accomplished by means of a transformer, 13, whose primary is included in the oscillating circuit of the oscillator and whose secondary is included in the tuned oscillating circuit, 14; another transformer, 15, couples the oscillating circuit, 14, to the antenna. Obviously the inductance coil L of Fig. 1 may itself serve as a primary of the transformer 13. In a wireless telegraph transmitter the transmission of energy to the antenna may be interrupted by means of a telegraph key, 16, closing a shunt around an inductance in the oscillating circuit, 14, thus throwing such circuit out of tune with the oscillator; or by similarly shunting the primary of 15 or the secondary of 13.

What I claim is:

1. An electrical oscillator wherein are combined a vacuum tube, means for passing an electric current through said tube, means for producing a high negative resistance in said tube, and an electrical oscillating circuit, whereby variations in the current in said tube are caused to excite oscillations in said oscillating circuit, substantially as set forth.

2. An electrical oscillator wherein are combined a mercury vapor tube, means for passing an electric current through said tube, means for producing a high negative resistance in said tube, and an electrical oscillating circuit, whereby variations in the current in said tube are caused to excite oscillations in said oscillating circuit, substantially as set forth.

3. A system for generating electrical oscillations wherein are combined means for maintaining a gaseous medium of such pressure and composition that the electric current hereinafter specified, when traversing it, produces a concentrated discharge with a high negative resistance and a small potential gradient, means for maintaining an electric current through such medium adapted to establish such discharge, and an electrical oscillating circuit wherein oscillations are excited as the result of variations of current in said medium, substantially as set forth.

4. An electrical oscillator wherein are combined a vacuum tube, means for passing an electric current through said tube, means for concentrating the discharge in said tube, and an electrical oscillating circuit, whereby variations in the current in said tube are caused to excite oscillations in said oscillating circuit, substantially as set forth.

5. An electrical oscillator wherein are combined a mercury vapor tube, means for passing an electric current through said tube, means for concentrating the discharge in said tube, and an electrical oscillating circuit, whereby variations in the current in said tube are caused to excite oscillations in said oscillating circuit, substantially as set forth.

6. An electrical oscillator wherein are combined a vacuum tube containing a gaseous medium at such pressure that the tube has a high negative resistance, means for passing an electric current through said tube, and an electrical oscillating circuit, whereby variations in the current in said tube are caused to excite oscillations in said oscillating circuit, substantially as set forth.

7. An electrical oscillator wherein are combined a mercury vapor tube having a low initial vacuum, means for passing an electric current through said tube, and an electrical oscillating circuit, whereby variations in the current in said tube are caused to excite oscillations in said oscillating circuit, substantially as set forth.

8. An electrical oscillator wherein are combined a vacuum tube, means for passing an electric current through said tube, a magnetic field for increasing the negative resistance of said tube, and an electrical oscillating circuit, whereby variations in the current in said tube are caused to excite oscillations in said oscillating circuit, substantially as set forth.

9. An electrical oscillator wherein are combined a mercury vapor tube, means for passing an electric current through said tube, a magnetic field for increasing the negative resistance of said tube, and an electrical oscillating circuit, whereby variations in the current in said tube are caused to excite oscillations in said oscillating circuit, substantially as set forth.

10. An electrical oscillator wherein are combined a low vacuum tube, means for passing an electric current through said tube, a magnetic field for increasing the negative resistance of said tube, and an electrical oscillating circuit, whereby variations in the current in said tube are caused to excite oscillations in said oscillating circuit, substantially as set forth.

11. An electrical oscillator wherein are combined a low vacuum mercury vapor tube, means for passing an electric current through said tube, a magnetic field for increasing the negative resistance of said tube, and an electrical oscillating circuit whereby variations in the current in said tube are caused to excite oscillations in said oscillating circuit, substantially as set forth.

12. An electrical oscillator wherein are combined a low vacuum tube, means for passing an electric current through said tube, and an electrical oscillating circuit, whereby variations in the current in said tube are caused to excite oscillations in said oscillating circuit, the vacuum in said tube and the current passing therethrough being adjusted so that said tube has a high negative resistance, substantially as set forth.

13. An electrical oscillator wherein are combined a low vacuum mercury vapor tube, means for passing an electric current through said tube, and an electrical oscillating circuit, whereby variations in the current in said tube are caused to excite oscillations in said oscillating circuit, the vacuum in said tube and the current passing therethrough being adjusted so that said tube has a high negative resistance, substantially as set forth.

14. An electrical oscillator wherein are combined a low vacuum tube containing a gaseous medium including a non-condensable gas, means for passing an electric current through said medium, and an electrical oscillating circuit, whereby variations in the current in said medium are caused to excite oscillations in said oscillating circuit, substantially as set forth.

15. An electrical oscillator wherein are combined a low vacuum tube containing a gaseous medium including a non-condensable gas and a condensable vapor, means for passing an electric current through said medium, and an electrical oscillating circuit, whereby variations in the current in said medium are caused to excite oscillations in said oscillating circuit, substantially as set forth.

16. An electrical oscillator wherein are combined a low vacuum tube containing a gaseous medium including a non-condensable gas and a condensable metallic vapor, means for passing an electric current through said medium, and an electric oscillating circuit, whereby variations in the current in said medium are caused to excite oscillations in said oscillating circuit, substantially as set forth.

17. An electrical oscillator wherein are combined a low vacuum tube having a definite quantity of a non-condensable gas and also a disintegrating, self-restoring cathode, means for passing an electric current through said tube, and an electrical oscillating circuit, whereby variations in the current in said tube are caused to excite oscillations in said oscillating circuit, substantially as set forth.

18. An electrical oscillator wherein are combined a low vacuum tube having a definite quantity of a non-condensable gas and also a liquid cathode, means for passing an electric current through said tube, and an electrical oscillating circuit, whereby variations in the current in said tube are caused to excite oscillations in said oscillating circuit, substantially as set forth.

19. An electrical oscillator wherein are combined a low vacuum mercury vapor tube having therein a definite quantity of a non-condensable gas, means for passing an electric current through said tube, and an electrical oscillating circuit, whereby variations in the current in said tube are caused to excite oscillations in said oscillating circuit, substantially as set forth.

20. An electrical oscillator wherein are combined a hermetically sealed vessel containing a rarefied gaseous medium, means for maintaining in said medium a sustained concentrated high voltage electrical discharge, and an electrical oscillating circuit, whereby variations in the current in said medium are caused to excite oscillations in said oscillating circuit, substantially as set forth.

21. An electrical oscillator wherein are combined a hermetically sealed vessel containing a rarefied gaseous medium, means for maintaining in said medium a sustained electrical discharge of high current density, and an electrical oscillating circuit, whereby variations in the current in said medium are caused to excite oscillations in said oscillating circuit, substantially as set forth.

22. An electrical oscillator wherein are combined a mercury vapor tube, means for maintaining in said tube a sustained high temperature electrical discharge, and an electrical oscillating circuit, whereby variations in the current in said tube are caused to excite oscillations in said oscillating circuit, substantially as set forth.

23. An electrical oscillator wherein are combined a mercury vapor tube, means for maintaining in said tube a sustained concentrated high voltage electrical discharge, and an electrical oscillating circuit, whereby variations in the current in said tube are caused to excite oscillations in said oscillating circuit, substantially as set forth.

24. An electrical oscillator wherein are combined a mercury vapor tube, means for maintaining in said tube a sustained electrical discharge of high current density, and an electrical oscillating circuit, whereby variations in the current in said tube are caused to excite oscillations in said oscillating circuit, substantially as set forth.

25. An electrical oscillator wherein are combined a mercury vapor tube having a definite quantity of a non-condensable gas, means for passing through said tube a high temperature electrical discharge, and an electrical oscillating circuit, whereby variations in the current in said tube are caused to excite oscillations in said oscillating circuit, substantially as set forth.

26. An electrical oscillator wherein are combined a mercury vapor tube having a definite quantity of a non-condensable gas, means for passing through said tube a concentrated high voltage electrical discharge, and an electrical oscillating circuit, whereby variations in the current in said tube are caused to excite oscillations in said oscillating circuit, substantially as set forth.

27. An electrical oscillator wherein are combined a mercury vapor tube having a definite quantity of a non-condensable gas, means for passing through said tube an electrical discharge of high current density, and an electrical oscillating circuit, whereby variations in the current in said tube are caused to excite oscillations in said oscillating circuit, substantially as set forth.

28. An electrical oscillator wherein are combined means for maintaining a sustained high temperature arc between self-renewing electrodes, and an electrical oscillating circuit, whereby variations of the current in said arc are caused to excite oscillations in said oscillating circuit, substantially as set forth.

29. An electrical oscillator wherein are combined a hermetically sealed vessel, means for maintaining therein a sustained high temperature arc between self renewing electrodes, and an electrical oscillating circuit whereby variations of the current in said arc are caused to excite oscillations in said oscillating circuit, substantially as set forth.

30. An electrical oscillator wherein are combined a vacuum tube, means for supplying an alternating current to said tube, means for producing a high negative resistance in said tube, and an electrical oscillating circuit, whereby variations of the current in said tube are caused to excite oscillations in said oscillating circuit, substantially as set forth.

31. An electrical oscillator wherein are combined a mercury vapor tube, means for supplying an alternating current to said tube, means for producing a high negative resistance in said tube, and an electrical oscillating circuit, whereby variations of the current in said tube are caused to excite oscillations in said oscillating circuit, substantially as set forth.

32. An electrical oscillator wherein are combined a medium having a high negative resistance, connections establishing electrical paths through such medium, and an electrical oscillating circuit connected between homologous points of the circuits including such paths, substantially as set forth.

33. An electrical oscillator wherein are combined a sensitive medium, connections establishing electrical paths through such medium, a common terminal at one end of such paths and an electrical oscillating circuit connected across the free terminals of such paths, substantially as set forth.

34. An electrical oscillator wherein are combined a sensitive medium, connections establishing electrical paths through such medium, a cathode common to such paths and an oscillating circuit connected across the anodes of such paths, substantially as set forth.

35. An electrical oscillator wherein are combined a medium having a high negative resistance, connections establishing electrical paths through such medium, a common terminal at one end of such paths, and an electrical oscillating circuit connected across the free terminals of such paths, substantially as set forth.

36. An electrical oscillator wherein are combined a sensitive medium having a high negative resistance, connections establishing electrical paths through such medium, a cathode common to such paths, and an oscillating circuit connected across the anodes of such paths, substantially as set forth.

37. An electrical oscillator wherein are combined a low pressure gaseous medium, connections establishing electrical paths through such medium, and an electrical oscillating circuit connected between homologous points of the circuits including such paths, substantially as set forth.

38. An electrical oscillator wherein are combined a low pressure gaseous medium, connections establishing electrical paths through such medium, a terminal common to one end of such paths, and an electrical oscillating circuit connected across the free terminals of such paths, substantially as set forth.

39. An electrical oscillator wherein are combined a low pressure gaseous medium, connections establishing electrical paths through such medium, a cathode common to such paths, and an electrical oscillating circuit connected across the anodes of such paths, substantially as set forth.

40. An electrical oscillator wherein are combined a vacuum tube, means for producing a high negative resistance in such tube, a plurality of anodes and a single cathode in such tube establishing a plurality of electrical paths through such tube, and an electrical oscillating circuit connected with such paths, substantially as set forth.

41. An electrical oscillator wherein are combined a mercury vapor tube, means for producing a high negative resistance in such tube, a plurality of anodes and a single cathode in such tube establishing a plurality of electrical paths through such tube, and an electrical oscillating circuit connected with such paths, substantially as set forth.

42. An electrical oscillator within are combined a mercury vapor tube, containing a definite pressure of a non-condensable gas, a plurality of anodes and a single cathode in such tube establishing electrical paths through such tube, and an electrical oscillating circuit connected with such paths, substantially as set forth.

43. An electrical oscillator wherein are combined a medium having a high negative resistance, a power circuit, an oscillating circuit and two conducting paths in such medium operating in parallel as regards the power circuit and in series as regards the oscillating circuit, substantially as set forth.

44. An electrical oscillator wherein are combined a medium having a high negative resistance, an oscillating circuit and two conducting paths in such medium connected in series and in opposite senses as regards the oscillating circuit, substantially as set forth.

45. An electrical oscillator wherein are combined a medium having a high negative resistance, an oscillating circuit and two conducting paths in such medium acting differentially to produce a cumulative effect on each oscillating circuit, substantially as set forth.

46. An electrical oscillator wherein are combined a medium having a high negative resistance, two conducting paths through such medium having two separate terminals which impose a small or non-fluctuating contact drop or surface effect and an oscillating circuit connected across such terminals, substantially as set forth.

47. An electrical oscillator wherein are combined a medium having a high negative resistance, two paths through such medium each path having a terminal which imposes a small or non-fluctuating contact drop and a terminal which imposes an irregular or fluctuating contact drop and an oscillating circuit connected with such paths so that the effects therein of the irregular fluctuations will be neutralized by acting on the oscillating circuit in opposite senses, substantially as set forth.

This specification signed and witnessed this thirteenth day of December, 1906.

FREDERICK K. VREELAND.

Witnesses:
JNO. ROB'T TAYLOR,
JOHN T. LOTSCH.